2,924,505

COPPER HYDRATE-PHOSPHORUS COMPLEX AND PROCESS FOR MAKING SAME

Edward C. Page, Jr., Bryn Mawr, and Roland W. Erling, Upper Darby, Pa., assignors to Henry Bower Chemical Manufacturing Company, Philadelphia, Pa., a corporation of Pennsylvania No Drawing. Application January 3, 1956
Serial No. 556,823

6 Claims. (Cl. 23—14)

This invention relates to a new and useful copper hydrate-phosphorus complex and to a process for making the same.

For many years it has been known that copper in the form in which it exists in the copper hydrate, cupric hydroxide, is far superior for fungicidal use to copper as it exists in compounds such as cupric oxide or copper sulfate. It has also been known that processes which have been proposed for making cupric hydroxide actually produce either cupric oxide or a product which is transformed within a relatively short time to cupric oxide. Heretofore, efforts to obtain a stable cupric hydroxide have proceeded in the direction of seeking to develop a process for producing cupric hydroxide having a high degree of purity. Unfortunately, these relatively pure products have likewise been unstable and have been unsatisfactory because they change to cupric oxide too soon after being made. Consequently, a commercially satisfactory cupric hydroxide has not been available and this has prevented copper in this form from going into wide use in the field of fungicides. The art has, therefore, turned to products which include copper sulfate, as, for instance, the well-known Bordeaux mixtures.

We have discovered a copper hydrate complex, and a process for making the same, which, for the first time, provides a product in which copper is in a form useful for fungicidal purposes and, at the same time, is combined in a product which is stable over long time periods and which is essentially free of the disadvantages present in the currently available basic salt products such as Bordeaux mixtures and the like. The unique copper hydrate complex of the present invention is characterized by the presence of phosphorus chemically bound in a copper hydrate in an amount sufficient to stabilize the product against the formation of cupric oxide. While the chemical mechanism of the stabilizing action of the phosphorus bound in the complex is not understood, we have discovered that the desired stabilizing action depends on the presence of an average bound phosphorus content as hereinafter described. We have also discovered that it is important to achieve and maintain a certain minimum average bound phosphorus content during the making of the product of the present invention and this is described in the description of the process which follows. Any substantial deviation from this minimum average content of bound phosphorus leads to the formation of cupric oxide and we have found that the process cannot be satisfactorily carried out if this is permitted to occur.

The process for the manufacture of the product of the present invention is performed in the following manner:

Step 1.—An aqueous solution of trisodium phosphate ($Na_3PO_4 \cdot 12H_2O$) is mixed with an aqueous solution of copper sulfate, the amounts being such that the mole ratio between the copper sulfate and the trisodium phosphate lies anywhere in the range of 1.5:1.0 to 1.0:1.0. The solutions may be either dilute or concentrated but we prefer to use concentrated solutions as a matter of convenience.

Step 2.—To the slurry prepared in Step 1 are added streams of aqueous copper sulfate and sodium hydroxide solutions such that a mole ratio of approximately 2:1 between the sodium hydroxide and the copper sulfate added to the slurry is maintained. At any one time any excess of sodium hydroxide over the above ratio to the copper sulfate present at that time (hereinafter referred to as "uncombined sodium hydroxide") must not be greater than substantially 1.5 moles of sodium hydroxide per mole of phosphorus present, expressed as $PO_4$, otherwise the precipitate being formed in the reaction will revert to a compound containing copper oxide. The addition of the copper sulfate and sodium hydroxide to the slurry may be carried to the point at which the precipitated product contains, on an air dry basis, a bound phosphorus content (expressed as $PO_4$) of not less than substantially 3.5%. It should be pointed out that the total amount of phosphorus from the trisodium phosphate of Step 1 does not appear as this bound phosphorus, but on the contrary a certain amount of phosphorus remains in soluble form and is removed in subsequent operations. Experience has shown that relatively minor changes in the operating procedure vary the portion of the original phosphorus which is bound. Typically, however, more than half of this phosphorus becomes bound in the complex when a complex with the above prescribed minimum of phosphorus is produced.

Step 3.—The reaction mixture is allowed to settle and the supernatant liquor is decanted and discarded.

Step 4.—The precipitate is washed with water to remove substantially all of the water-soluble impurities, including the unbound phosphate. The wash liquor is discarded.

Step 5.—The precipitate is then filtered and the filtrate is discarded.

Step 6.—The filter cake is dried at a temperature of about 140° F. and subsequently comminuted to break up the dried cake.

We find that it is best to carry out Step 1 by mixing the copper sulfate with the trisodium phosphate in a mole ratio of 1:1. The resulting slurry is easier to agitate than the slurry resulting from a mole ratio of 1.5:1.0. The order in which the solutions are added in Step 1 does not appear to alter the product of the invention significantly and it has been found that the slurry may be used shortly after it is made or may be used, as far as can be determined, any time after being made in carrying out the subsequent steps.

Step 2 may be carried out in various ways provided that the addition of the sodium hydroxide is adjusted to the addition of copper sulfate as prescribed under Step 2. Thus 1.3 moles of sodium hydroxide, per mole of phosphate in the trisodium phosphate, may be added initially to the slurry of Step 1. Subsequently, the sodium hydroxide and copper sulfate are added continuously in the ratio of two moles of sodium hydroxide to one mole of copper sulfate, and at the completion of the addition of the sodium hydroxide, copper sulfate subsequently added in the amount of one mole for each two moles of sodium hydroxide originally added separately to the slurry of Step 1. Copper sulfate, too, may be added separately to the slurry before the addition of any sodium hydroxide. But the quantity added should be limited to prevent the formation of compounds with excessive amounts of bound sulfate. We know that, when the addition of the copper sulfate and sodium hydroxide to the slurry is properly conducted the insoluble sulfate content of air dried complex with around the prescribed minimum phosphorus content, may be kept as low as approximately one percent.

The concentration of the solutions may be varied somewhat without significant effect on the product of the invention. Thus the solution strength of the sodium hydroxide has been varied from 0.078 to 0.085 gram NaOH/cc. without measurably affecting the final product. It is preferred to use solutions of trisodium phosphate and copper sulfate as near as possible to their saturation points under ambient conditions to reduce the size of apparatus. But the strength of copper sulfate solutions has been varied from 0.046 to 0.088 gram copper per cc. without measurable adverse effect on the final product. Preferably the phosphate ($PO_4$) content of the trisodium phosphate solution in Step 1 is .05 to .06 gram/cc.

Upon completion of the addition of the reagents in Step 2 to the slurry prepared in Step 1, it is preferred that the mole ratio between the total sodium hydroxide added and the copper sulfate added to the slurry be as close to 2:1 as is reasonable since we have discovered that too much caustic in excess of copper sulfate causes the formation of copper oxide in the compound and too much copper sulfate in excess of caustic causes the formation of bound sulfate.

At the end of Step 2, carbon dioxide or some other acidic agent may be added to the mixture to eliminate any uncombined sodium hydroxide. In practice such agents have been added until the pH of the reaction is reduced from the level characteristic before such addition of around 11.0 to a pH of about 10.0. Addition of such neutralizing agents is merely a precaution and is unnecessary when the reaction is well controlled. Ordinarily the amount of any neutralizing agent such as carbon dioxide bound in the product of the invention is nominal.

Separation of the product from the surrounding liquid may be carried out in conventional equipment designed for decantation followed by filtration, or for centrifugation. Washing may be effected by successive decantations, by washing in a filter press or centrifuge, or by other suitable means.

It has been found that the product may be dried at temperatures around 140° F. Substantially higher temperatures may cause degradation of the compound to one containing copper oxide and this should be avoided.

As a specific example of the production of the product of the present invention, the following is given:

To a solution of 5.6 lbs. of trisodium phosphate ($Na_3PO_4 \cdot 12H_2O$) in 2.4 gallons of water are added 1.4 gallons of copper sulfate solution containing 0.0800 gram of copper per cc. in a 60 gallon stirred vessel to give a slurry containing 1.40 lbs. phosphate (as $PO_4$). To the slurry are added 25.0 gallons of the aqueous sodium hydroxide solution (.0800 gram NaOH/cc.) and 19.9 gallons of the aqueous copper sulfate solution (.0800 gram copper (Cu) per cc.) maintaining a uniform ratio of 1.26 gallons of sodium hydroxide solution to 1.0 gallons of copper sulfate solution. Upon completion of the addition, carbon dioxide may be added until the pH of the reaction mixture is reduced to around 10.0 The mole amounts of the sodium hydroxide and copper sulfate added following the preparation of the initial slurry in the above example are 28.5 moles sodium hydroxide to 1 mole of slurry and 14.25 moles copper sulfate to 1 mole of slurry.

The slurry so produced is transferred to a settling tank and combined with previous or subsequent batches. By successive settlings, additions of wash water, and decantations the product of the invention is washed free of soluble phosphate and sulfate generated in the reaction vessel. Subsequently, the wash water is removed by filtration and discarded. The cake from the filter is then dried to yield approximately 24 pounds of product. It has been found that the product of this invention has the following typical analysis if the above procedure is followed:

|  | Percent |
|---|---|
| Assay of copper (as Cu) (average for the batch) | 58–60 |
| Phosphate (as $PO_4$) (average for the batch) | 3.9 |
| Sulfate (as $SO_4$) (average for the batch) | 1.1 |
| Sodium (as Na) (average for the batch) | 0.2 |

Calculated as CuO the copper content set forth above is from 72.6% to 75.2%.

It has been found that the product may be stored under water as a wet cake, as a dry power or in drums under typical warehouse conditions for at least several months without conversion to copper oxide. The final product has a distinctive blue color and a very fine particle size.

While the process of the present invention has been described by reference to a preferred example, it will be understood that variations may be made within the general ranges indicated. It should be noted, however, that the presence of bound phosphorus in the product is essential and we make no claim to products in which phosphorus is present in a form largely removable by washing with water or to processes in which the original quantity of trisodium phosphate is recovered and returned to the process.

The copper hydrate-phosphorus complex of the present invention in finely divided form is particularly useful as a fungicide which may, for example, be dusted on the foliage or added to water and sprayed on the foliage. As a specific example one part by weight of the finely divided complex is added to 5,000 parts by weight of water. The product of the present invention is also useful in the field of marine anti-fouling paints. For this use the finely divided complex is dispersed in a paint matrix. A specific example of such a marine paint consists of the following:

|  | Lbs. |
|---|---|
| W. W. grade rosin | 285 |
| Fish oil | 120 |
| Zinc stearate | 19 |
| Copper hydrate-phosphorus complex | 105 |
| Zinc oxide | 170 |
| Magnesium silicate | 56 |
| Solvent naphtha | 245 |
|  | 1000 |

Such marine anti-fouling paints are particularly useful in the protection of ships' bottoms from fouling, in the protection of pilings, in the protection of wood and in the protective coating of structures such as the walls of swimming pools. The complex of the present invention is also useful in the elimination and control of molluscs such as snails.

Having thus described our invention, we claim:

1. A method for preparing a non-crystalline, stable, blue, copper hydrate-phosphorus complex fungicide which comprises reacting an aqueous solution of trisodium phosphate with an aqueous solution of copper sulfate, and employing in the reaction a ratio of from 1 to 1.5 moles of copper sulfate to one mole of trisodium phosphate, thereby forming a slurry, adding to said slurry an aqueous solution of sodium hydroxide and an aqueous solution of copper sulfate in the ratio of about two moles of sodium hydroxide to one mole of copper sulfate, thereby forming a precipitate containing bound phosphorus, the amounts of the added sodium hydroxide and copper sulfate being such that the content of bound phosphorus in the said precipitate is not less than substantially 3.5% calculated as $PO_4$.

2. The method of claim 1 further characterized by the step of adding carbon dioxide to the reaction mixture, after addition of the sodium hydroxide and copper sulfate, in an amount sufficient to provide a pH of about 10.

3. The method of claim 1 further characterized by the fact that the initial addition of sodium hydroxide to the slurry is made prior to the initial addition to the slurry of the copper sulfate.

4. The method of claim 1 further characterized by the fact that the initial addition of sodium hydroxide to the slurry is made prior to the initial addition to the slurry of the copper sulfate and wherein the said sodium hydroxide is added initially in an amount substantially corresponding to 1.3 moles per mole of phosphate in the said trisodium phosphate.

5. The method of claim 1 further characterized by the step of adding the solution of sodium hydroxide and the solution of copper sulfate to the initial slurry in separate streams.

6. A method for preparing a new, substantially non-crystalline, stable, blue, copper hydrate-phosphorus complex fungicide containing between 72.6% to 75.2% copper calculated as CuO and not less than substantially 3.5% bound phosphorus calculated as $PO_4$, comprising reacting 1 to 1.5 moles of copper sulfate with 1 mole of trisodium phosphate, thereby forming a slurry, adding to said slurry in separate streams about 28.5 moles of sodium hydroxide to 1 mole of slurry and about 14.25 moles of copper sulfate to 1 mole of slurry, thereby forming a precipitate and then washing and drying the product.

References Cited in the file of this patent

UNITED STATES PATENTS

| | | |
|---|---|---|
| 2,237,045 | Booth et al. | Apr. 1, 1941 |
| 2,414,974 | Nielsen | Jan. 28, 1947 |
| 2,542,813 | Heath | Feb. 20, 1951 |
| 2,548,646 | Bicknell et al. | Apr. 10, 1951 |
| 2,562,062 | Rethwisch et al. | July 24, 1951 |
| 2,738,265 | Nielsson | Mar. 13, 1956 |
| 2,795,483 | Denslow | June 11, 1957 |

OTHER REFERENCES

"Comprehensive Treatise on Inorganic and Theoretical Chemistry," by J. W. Mellor, published by Longmans, Green and Co., London (1923), vol. 3, p. 291.